United States Patent [19]

Bakke

[11] 3,831,354

[45] Aug. 27, 1974

[54] DUST COLLECTOR INCLUDING DIFFUSER ASSEMBLY

[75] Inventor: Even Bakke, New Providence, N.J.

[73] Assignee: The Slick Corporation, New York, N.Y.

[22] Filed: Feb. 14, 1972

[21] Appl. No.: 225,909

[52] U.S. Cl. .................................... 55/418, 55/341

[51] Int. Cl. .................................... B01d 46/02

[58] Field of Search ............ 55/341, 418, 324, 320; 138/37, 40; 98/18, 40 D; 239/590.3

[56] References Cited

UNITED STATES PATENTS

| | | | |
|---|---|---|---|
| 3,191,630 | 6/1965 | Demyan | 138/37 |
| 3,246,453 | 4/1966 | Becker | 55/418 |
| 3,345,806 | 10/1967 | Bullock et al. | 55/341 |

FOREIGN PATENTS OR APPLICATIONS

| | | | |
|---|---|---|---|
| 801,011 | 12/1950 | Germany | 55/418 |

OTHER PUBLICATIONS

The Mikro-Pulsaire Dust Collector Bulletin PC2 Pulverizing Machinery Summit N.J. dated 4/70 pages 1 and 2.

*Primary Examiner*—Bernard Nozick
*Attorney, Agent, or Firm*—Robert E. Isner

[57] ABSTRACT

A diffuser assembly for dust collectors and like apparatus for converting a high velocity stream of particulate bearing gaseous carrier of relatively small cross-sectional area by aerodynamic diffusion into a low velocity stream of much larger cross-sectional area having said particulates uniformly distributed therein.

7 Claims, 3 Drawing Figures

DUST COLLECTOR INCLUDING DIFFUSER ASSEMBLY

This invention relates to the aerodynamic diffusion of rapidly moving streams of gas, such as gaseous carriers bearing particulate matter therein, and particularly to an improved construction for a gaseous carrier inlet diffuser construction for dust collectors.

The efficient and rapid conversion of a rapidly moving particulate bearing stream of gas of relatively small cross-sectional area into a slower moving stream of gas of appreciably larger cross-sectional area with the particulates uniformly distributed therein is a frequently faced problem in dust collector system design and such is accentuated when the particulate matter is abrasive in character. For example, two of the problems inherent in the operation of dust collection devices generally, and particularly in permeable media type collectors, are the accommodation of the abrasive effects of rapidly moving particulate carrying gas streams and the unequal loading of localized portions of the available permeable filter media occasioned by non-uniform gas flow within the dust collector housing. The accelerated deleterious wear on the collector components resulting from abrasion, and particularly on permeable filter media of the fabric types, markedly shortens the effective operating life thereof with consequent increase in required maintenance and in the hazard of operational failure. Unequal loading of the permeable filter media serves to impede the effectiveness of the required periodic cleaning thereof and deleteriously affects the collection efficiency and capacity of the collector. In order to ameliorate these problems, the art has long employed many variant types of auxiliary structures to divert, slow down or otherwise convert the high speed stream of particulate bearing gaseous carrier into a slower moving and desirably uniformly dispersed stream intermediate its point of admission to the collector and its locus of contact with the permeable filter media therein. Unfortunately, however, most of these expedients have involved gas stream diversion or the interposition of a baffle plate or like diffuser element in the moving stream of particulate bearing gaseous carrier and any resulting improvement in flow characteristics within the collector have generally been attended by an antithetical increase in abrasion and erosion of the stream diversion or diffuser elements themselves with consequent problems attendant thereto.

This invention may be briefly described as an improved construction for a gas diffusion assembly for dust collection and similar devices for aerodynamically diffusing the energy of a rapidly moving stream of gas of relatively small cross-sectional area into a substantially uniformly distributed and slower moving stream of gas of appreciably larger cross-sectional area and which, in its broader aspects, includes the selective positioning of a selectively sized, peripherally flanged perforated plate in spaced coaxial relation with the terminus of the gaseous carrier conduit with the flange facing the flow of gaseous carrier therethrough. In its narrower aspects, the subject invention includes the utilization of a flanged perforated plate of a perimetric contour complemental to that of the conduit emitting the stream of carrier gas but of a predetermined lesser cross-sectional extent and its selective positioning at a predetermined angle of inclination from perpendicularity to the flow of the particulate bearing gaseous carrier emanating from the gaseous carrier inlet conduit to the dust collector device housing.

Among the advantages of the subject invention is the provision of a simple and inexpensive diffuser assembly for moving gas streams that is particularly adopted for utilization in dust collectors and which effectively converts, by primarily aerodynamic diffusion, the kinetic energy of a rapidly moving particulate matter bearing gaseous carrier stream of small cross-sectional areas into a low velocity and substantially evenly distributed flow of appreciably larger cross-sectional area, as for example, effectively over the entire cross-section of the dirty air plenum chamber of a dust collector and with a consequent uniform loading of the filter medium, minimization of reentrainment during cleaning and minimization of deleterious abrasion of both the collector components and the diffuser assembly itself.

The object of this invention is the provision of an improved construction for a dust collection device gas diffuser assembly for the aerodynamical conversion of a high velocity particulate bearing gas stream of relatively small cross-sectional area into a low velocity and substantially uniformly distributed gas stream of appreciably larger cross-sectional area.

Another object of this invention is the provision of an improved gaseous inlet diffuser construction for dust collectors.

A further object of this invention is the provision of a simple and inexpensive gaseous inlet diffuser construction for permeable media type dust collectors.

Other objects and advantages of this invention will become apparent from the following specification and from the accompanying drawings which illustrate, in accord with the mandate of the patent statute, the nature of a preferred, as presently contemplated, embodiment embodying the principles of the subject invention.

Referring to the drawings.

Figures 1, 2, 3:
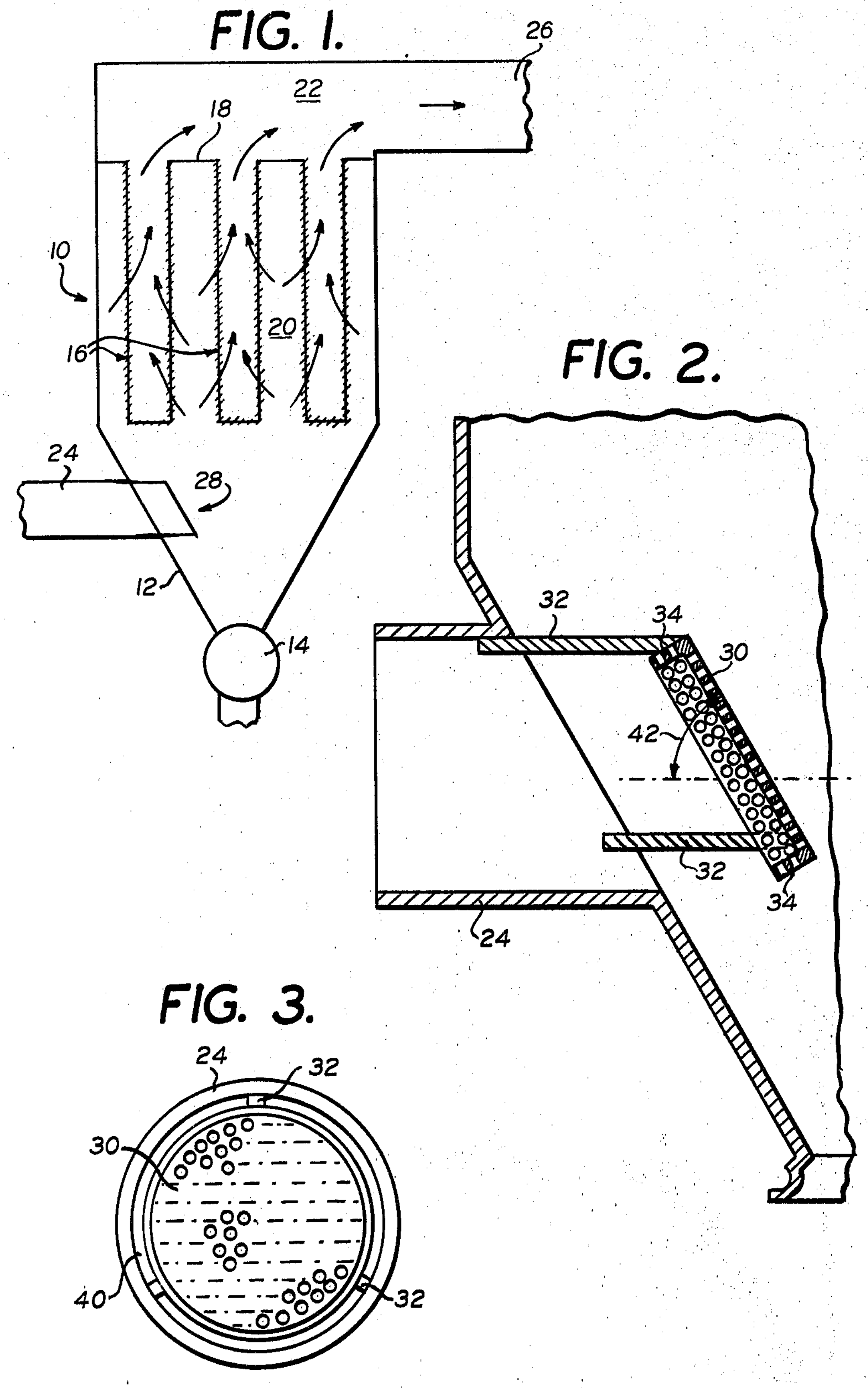
FIG. 1 is a schematic illustration, in the nature of a vertical section, of certain of the essential elements of a bottom entry, fabric type dust collector, having an improved diffuser assembly constructed in accord with the principles of the invention incorporated therein.
FIG. 2 is an enlarged vertical section of the dirty gas entry portions of the dust collector unit of FIG. 1 and illustrating, by way of example, the structure and orientation of the component elements of the improved diffuser assembly relative to the rapidly moving gas stream emanating from the inlet conduit thereto.
FIG. 3 is an elevational view of the improved inlet diffuser assembly shown in FIG. 2, as viewed from downstream thereof.

As generally noted above, the subject invention has been found to be of utility in dust collectors and in similar environments wherein it is desired to convert a rapidly moving stream of particulate bearing gas of relatively small cross-sectional area into a substantially uniformly distributed and slower moving stream of gas of appreciably larger cross-sectional area. Particular utility is found in conjunction with permeable media type collectors and, as a consequence, the following portion of this specification will be directed to the description of an illustrative embodiment wherein the invention is incorporated in a bottom entry, fabric type collector, as illustrative of a preferred example of the utilization thereof as presently contemplated by the inventor.

Referring now to the drawings and initially to FIG. 1, there is schematically illustrated certain of the essential structural components of a conventional bottom entry, fabric type dust collector device and essentially comprising a vertically disposed perimetric housing portion 10 of either circular or rectangular cross-section dependently terminating in a tapering generally conical or tetrahedron shaped particulate matter collecting hopper 12 from which collected material is removed via an airlock type discharge assembly 14. Disposed within the housing 10 is the requisite permeable filter media, illustratively constituted by a plurality of elongate, retainer mounted filter tubes or socks having closed dependent ends and open upper ends. The filter socks 16 are suitably constituted of felted or woven fabrics and are suspended at their open upper ends from a tubesheet 18, which additionally functions to separate the dirty air plenum, generally designated 20 and in which the filter media tubes 16 are suspended, from the superposed clear air plenum, generally designated 22, disposed in fluid communication with the interior of the filter socks.

In the normal operation of such a type collector, a particulate bearing gaseous carrier of relatively small cross-sectional area is introduced at relatively high speeds through an inlet conduit 24 into the hopper 12, which hopper is of appreciably larger volume and cross-sectional area. Such particulate bearing gaseous carrier is then desirably induced to flow, as generally indicated by the arrows, upwardly at reduced velocities and over the larger available cross-sectional area to and through the permeable filter media 16, through the clean air plenum 22 and exteriorly of the collector, via the clean air unit conduit 22, as by the action of a fan, blower or other prime movant disposed downstream thereof and not shown in the drawing. The induced flow of the gaseous carrier through the permeable filter media 16 effects selective separation of the particulate matter carried thereby which, through subjection of the permeable media 16 to periodic cleaning of known techniques, falls into and accumulates within the hopper 12 for removal as desired.

Disposed in spaced coaxial relation with the terminus of the illustrated inlet conduit 24 is a selectively sized and positioned diffuser assembly, generally designated 28, constructed in accord with the principles of this invention.

Referring now to FIGS. 2 and 3, such diffuser assembly incorporating the principles of this invention includes a perforated plate member 30 of a perimetric contour essentially complemental to that of the gas stream confining conduit 24, e.g., circular, but of a predetermined lesser transverse dimension thereof and having an open area of about 42 percent as, for example, obtained through the utilization of 3/16 inch diameter holes on 3/8 inch centers. Information available to date indicates that, while the above described 42 percent open area is preferred, variations in open area of up to about ± 10 percent can be tolerated without undue deterioration of performance. Such perforated plate member 30 is desirably disposed in spaced coaxial relation downstream of the terminus of the conduit 23 and at a predetermined angle 42 to the longitudinal axis of the moving stream of particulate bearing carrier gas, as by a plurality of extending struts 32 or the like. The perforated plate member 30 additionally includes a perimetric flange portion 34, which may or may not be of perforated character, perpendicularly disposed and facing the oncoming gaseous carrier stream on the upstream side thereof.

Experimental results to data indicate that both the size and positioning of the perforated plate member 30 relative to the terminus of the conduit 24 confining the high velocity gas stream are attended with a relatively high degree of criticality for effecting the desired aerodynamic energy conversion. By way of further specific example, a preferred construction will incorporate, for a circular gas stream confining conduit 24 of diameter D a complementary shaped perforated plate member 30 of a diameter of 8D/9, thus providing a ratio of area of plate to area of inlet duct of $(8/9)^2$ and an unimpeded gas flow annulus 40 (See FIG. 3) of D/9 radial extent. The flange 34 is desirably of a length of D/9 and said plate member is disposed at an angle of inclination or attack 42 of about 74° to the longitudinal axis of the high velocity gas stream and at a distance of about 4.75D/9 away from the terminus thereof.

In a dust collection device of the bottom entry type illustrated in FIG. 1, incorporation of a diffuser assembly sized and positioned as above delineated effectively converts the kinetic energy of the high velocity particulate bearing gaseous carrier introduced into the hopper portion 12 into a uniformly distributed low velocity upwardly moving stream that not only minimizes wear on the lower portions of the filter media and offers minimal reentrainment of separated particulates during cleaning but provides a highly uniform loading of the filter medium with minimal abrasion and wear of the diffuser components per se. Although the mechanics of the operation are not fully understood at the present time, it is believed that the subject construction effects essentially an aerodynamic diffusion of energy rather than an energy conversion of a mechanical or impact based character.

As presently viewed, it is believed that the perforate plate 30 operatively subdivides the generally cohesive jet like flow of the incoming high velocity gaseous carrier into a plurality of diminutive and highly turbulent jets on the downstream side thereof. In cooperation therewith, the perforated flange 34 and the surrounding essentially unimpeded flow within the annulus 40 apparently creates or results in additional localized turbulence around the periphery of the plate 30 that serves to confine and aerodynamically merge with the multi-jet highly turbulent flow downstream of the plate, all of which creates a low pressure zone thereat that apparently effectively limits the locus of energy conversion to a relatively small volume or space downstream of the plate and remote from the defining wall of the hopper or the like. Apart from markedly contributing to a highly localized zone of energy conversion, such mode of operation apparently also functions to only minimally interfere with the periodic gravity induced displacement of accumulated particulate matter from the permeable filter media 16 to the hopper 12 and minimized undesired reentrainment thereof.

I claim:

1. In a dust collecting device wherein particulate matter borne by a gaseous carrier is separated therefrom, a plenum chamber containing means to effect the separation of said particulate matter from said gaseous carrier, an inlet conduit terminally connected to said plenum chamber for introducing a high velocity stream of particulate material bearing gaseous carrier therein, and a diffuser assembly disposed within said plenum chamber in the path of advance of said high velocity stream of particulate material bearing gaseous carrier, said diffuser assembly including a perforated plate member of perimetric contour corresponding to that of said inlet conduit but of lesser transverse extent thereof and having a perpendicular perimetric flange mounted thereon, and means positioning said perforated plate member in spaced coaxial relation with the terminus of said inlet conduit with said flange facing the flow of gaseous carrier and at a predetermined angle of inclination from perpendicularity to the longitudinal axis of the inlet conduit and to the flow of gaseous carrier bearing particulate matter emanating therefrom such as to avoid deflection of the portions of said gaseous carrier impinging upon the imperforate portions of said plate member toward said separating means and to subdivide a substantial portion of said gaseous carrier into a multiplicity of jets on the downstream side thereof peripherally encompassed by an annulus of unimpeded high velocity carrier gas flow.

2. The combination as set forth in claim 1 wherein said perforated plate presents about 32 to 52 percent open area to said high velocity gas stream.

3. The combination as set forth in claim 1 wherein the cross-sectional areal extent of said plate is about $(8/9)^2$ that of said inlet conduit so as to provide an unimpeded annulus for high speed gas flow therepast.

4. The combination as set forth in claim 1 wherein said perforated plate member is disposed at about a 74° angle of attack to said oncoming high velocity gas stream.

5. The combination as set forth in claim 1 wherein said perforated plate is disposed at a distance of about D/2 from the terminus of said inlet conduit when said conduit is of a diameter D.

6. In a dust collecting device wherein particulate matter borne by a gaseous carrier is separated therefrom, a plenum chamber containing means to effect the separation of said particulate matter from said gaseous carrier, an inlet conduit terminally connected to said plenum chamber for introducing a high velocity stream of particulate material bearing gaseous carrier therein, and a diffuser assembly disposed within said plenum chamber in the path of advance of said high velocity stream of particulate material bearing gaseous carrier, said diffuser assembly including a perforated plate member of perimetric contour corresponding to that of said inlet conduit and so constituted as to present about 32–52 percent open area to said high velocity gas stream, said correspondingly contoured perforated plate member being of perimetric cross-sectional areal extent of about $(8/9)^2$ of said inlet conduit so as to provide an unimpeded annulus for high speed gaseous carrier flow peripherally therepast, and means positioning said perforated plate member in spaced centered relation with the terminus of said inlet conduit at about a 16° angle of inclination from perpendicularity to the longitudinal axis of the inlet conduit and to the flow of gaseous carrier bearing particulate matter emanating therefrom such as to avoid deflection of the portions of said gaseous carrier impinging upon the imperforate portions of said plate member toward said separating means and to subdivide a substantial portion of said gaseous carrier into a multiplicity of jets on the downstream side thereof peripherally encompassed by said annulus of high speed carrier gas flow.

7. The combination as set forth in claim 6 wherein said perforated plate member includes a perpendicular perimetric flange mounted thereon and disposed to face the flow of gaseous carrier emanating from said inlet conduit.

* * * * *